United States Patent
Ahssini et al.

(10) Patent No.: US 11,144,446 B2
(45) Date of Patent: Oct. 12, 2021

(54) LOGICAL MEMORY UNIT FOR FLASH MEMORY

(71) Applicant: PROTON WORLD INTERNATIONAL N.V., Diegem (BE)

(72) Inventors: Youssef Ahssini, Vilvoorde (BE); Guy Restiau, Ramillies (BE)

(73) Assignee: Proton World International N.V., Diegem (BE)

( * ) Notice: Subject to any disclaimer, the term of this patent is extended or adjusted under 35 U.S.C. 154(b) by 75 days.

(21) Appl. No.: 16/153,542

(22) Filed: Oct. 5, 2018

(65) Prior Publication Data
US 2019/0114256 A1    Apr. 18, 2019

(30) Foreign Application Priority Data
Oct. 13, 2017   (FR) ...................................... 1759623

(51) Int. Cl.
*G06F 12/02*    (2006.01)
*G06F 3/06*    (2006.01)

(52) U.S. Cl.
CPC .......... *G06F 12/0246* (2013.01); *G06F 3/064* (2013.01); *G06F 3/0607* (2013.01); *G06F 3/0679* (2013.01); *G06F 2212/7201* (2013.01); *G06F 2212/7202* (2013.01)

(58) Field of Classification Search
USPC ........................................................ 711/103
See application file for complete search history.

(56) References Cited

U.S. PATENT DOCUMENTS

| | | | |
|---|---|---|---|
| 5,457,658 A | 10/1995 | Nijima et al. | |
| 6,513,095 B1 | 1/2003 | Tomori | |
| 6,581,132 B1 * | 6/2003 | Kakinuma | G06F 12/0246 711/103 |
| 7,139,864 B2 | 11/2006 | Bennett et al. | |
| 8,392,690 B2 | 3/2013 | Chu et al. | |
| 8,566,505 B2 | 10/2013 | Kilzer et al. | |

(Continued)

FOREIGN PATENT DOCUMENTS

| | | |
|---|---|---|
| DE | 10 2008 059 352 A1 | 6/2010 |
| EP | 2058737 A1 | 5/2009 |
| WO | 2012/013683 A1 | 2/2012 |

OTHER PUBLICATIONS https://developer.arm.com/documentation/101811/0101/Virtual-and-physical-addresses (retrieved May 2, 210201) (Year: 2021).*

(Continued)

*Primary Examiner* — Michael Krofcheck
*Assistant Examiner* — John Francis Wojton
(74) *Attorney, Agent, or Firm* — Seed IP Law Group LLP

(57) ABSTRACT

The disclosure concerns a flash memory interface having a memory management unit including a comparator configured to determine whether an address of a flash memory access operation corresponds to a logical address or a physical address by comparing the address with one or more address ranges and a logical memory unit configured to convert logical addresses into physical addresses and to provide the physical addresses to the flash memory. The memory management unit is configured to direct physical addresses to the flash memory and to direct logical addresses to the logical memory unit for conversion into physical addresses.

18 Claims, 2 Drawing Sheets

(56) References Cited

U.S. PATENT DOCUMENTS

| | | | |
|---|---|---|---|
| 8,661,190 | B2 | 2/2014 | Ou |
| 9,612,955 | B2 | 4/2017 | Akella et al. |
| 10,049,122 | B1 | 8/2018 | Faibish et al. |
| 2005/0071570 | A1* | 3/2005 | Takasugl ............ G06F 12/0862 711/137 |
| 2006/0085623 | A1 | 4/2006 | Kim et al. |
| 2006/0136656 | A1* | 6/2006 | Conley ................ G11C 16/12 711/103 |
| 2006/0271727 | A1* | 11/2006 | Wang ................ G06F 12/0246 711/103 |
| 2007/0113120 | A1 | 5/2007 | Dodge |
| 2008/0109592 | A1 | 5/2008 | Karamcheti et al. |
| 2008/0307158 | A1 | 12/2008 | Sinclair |
| 2009/0012976 | A1 | 1/2009 | Kang et al. |
| 2009/0172259 | A1 | 7/2009 | Prins et al. |
| 2010/0070688 | A1 | 3/2010 | Lin |
| 2010/0169543 | A1 | 7/2010 | Edgington et al. |
| 2011/0022819 | A1 | 1/2011 | Post et al. |
| 2011/0066790 | A1 | 3/2011 | Mogul et al. |
| 2011/0238886 | A1 | 9/2011 | Post et al. |
| 2012/0023282 | A1* | 1/2012 | Rub .................... G06F 12/0246 711/103 |
| 2015/0089183 | A1* | 3/2015 | Bains ................ G06F 12/0292 711/202 |
| 2016/0147594 | A1 | 5/2016 | Walker et al. |
| 2016/0203075 | A1 | 7/2016 | Shin |
| 2016/0239218 | A1 | 8/2016 | Gil et al. |
| 2017/0336996 | A1 | 11/2017 | Dawirs et al. |
| 2017/0337141 | A1* | 11/2017 | Geagan .................. H04L 9/002 |
| 2018/0074703 | A1 | 3/2018 | Dawirs et al. |
| 2021/0096984 | A1* | 4/2021 | Luo ...................... G06F 12/1054 |

OTHER PUBLICATIONS

Ahn et al., "μ*-Tree: An Ordered Index Structure for NAND Flash Memory with Adaptive Page Layout Scheme," IEEE Transactions on Computers, vol. 62, No. 4, Apr. 2013, pp. 784-797.

Fang et al. "A self-adaptive improved μ-Tree index structure for flash-based DBMS," International Conference on Systems and Informatics, May 19-20, 2012, pp. 1088-1091.

Hamilton, E., "JPEG File Interchange Format Version 1.02," Sep. 1, 1992, retrieved from https://www.w3.org/Graphics/JPEG/jfif3.pdf on Feb. 13, 2019, 9 pages.

Ho et al., "A DRAM-flash index for native flash file systems," Proceedings for the Ninth IEEE/ACM/IFIP International Conference on Hardware/Software Codesign and System Synthesis, Article No. 3, Sep. 29, 2013-Oct. 4, 2013, 4 pages.

"IBM solidDB Version 7.0 Getting Started Guide," $1^{st}$ Ed., $5^{th}$ revision, 2013, 94 pages.

Kim et al., "LSB-Tree: a log-structured B-Tree index structure for NAND flash SSDs," Des Autom Embed Syst 19:77-100, 2015.

Ou et al., "HIFFS: a Hybrid for Flash File System," IEEE, 2015, pp. 363-364.

Rouse, M., "Definition transaction," Apr. 2005, retrieved from https://searchcio.techtarget.com/definition/transaction on Feb. 13, 2019, 1 page.

Zeinalipour-Yazti et al., "MicroHash: An Efficient Index Structure for Flash-Based Sensor Devices," *Fast '05: $4^{th}$ Usenix Conference on File and Storage Technologies*, 2005, pp. 31-44.

\* cited by examiner

LOGICAL MEMORY UNIT FOR FLASH MEMORY

BACKGROUND

Technical Field

The present disclosure relates to the field of flash memories, and in particular to an interface between a processing unit and flash memory.

Description of the Related Art

Flash memories are increasingly used in electronic devices as a means of storing data in a non-volatile fashion. Flash memories have advantages over other forms of non-volatile memory, such as EEPROM (electronically erasable programmable read-only memory), in terms of speed. In particular, whereas an EEPROM generally allows individual bytes to be programmed and erased, in a flash memory, the granularity for write operations remains relatively low, but the granularity for erase operations is generally at a page or block level. The erase operation itself being relatively slow, the overall speed of the memory can be increased by only performing erase operations for relatively large memory zones and thereby reducing the number of erase operations that are performed.

It would thus be desirable in some applications to replace EEPROM incorporated in existing processing systems by flash memory. However, there are technical difficulties in doing so. Indeed, the memory management in the case of flash memory is relatively complex due to the programming constraints of such a memory. For example, decisions should be made as to whether to write new data to new pages, or whether to erase existing pages to make room. Furthermore, the cells of a flash memory may be subjected to only a limited number of write cycles, and therefore to ensure a long overall lifespan of the memory, it is generally an objective of the memory management algorithms to evenly distribute the memory across the flash memory array. Modifying the software of a CPU in order to allow such a complex memory management represents a significant task.

There is thus a need in the art for a solution permitting a flash memory to be integrated into a processing system in a relatively simple fashion.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

It is an aim of embodiments of the present description to at least partially address one or more needs in the prior art.

According to one aspect, there is provided a flash memory interface comprising: a memory management unit including a comparator configured to determine whether an address of a flash memory access operation corresponds to a logical or physical address by comparing the address with one or more address ranges; a logical memory unit configured to convert logical addresses into physical addresses and to provide the physical addresses to the flash memory; wherein the memory management unit is configured to direct physical addresses to the flash memory and to direct logical addresses to the logical memory unit for conversion into physical addresses.

According to one embodiment, the memory management unit further comprises a configuration memory storing an indication of the one or more address ranges.

According to one embodiment, the logical memory unit comprises: an address generator configured to generate a physical address based on the logical address and on a block identifier identifying one or more blocks in the flash memory, wherein the address generator comprises an address converter configured to convert each logical address into a corresponding block identifier.

According to one embodiment, the address generator comprises one or more of: a storekeeper configured to manage the use of blocks and/or pages in the flash memory; a translator configured to map logical addresses and/or block identifiers to physical addresses in the flash memory based on at least one offset; a rotation unit configured to assign physical addresses in the flash memory to logical addresses and/or block identifiers by rotation among the available physical addresses; and a cryptographic circuit configured to generate physical addresses based on a decryption of the logical address.

According to one embodiment, the memory management unit and the logical memory unit are further configured: to provide each physical address to a write controller of the flash memory if the flash memory access operation corresponds to a write operation; and to provide each physical address to a read input of the flash memory if the flash memory access operation corresponds to a read operation.

According to one embodiment, the memory management unit is implemented by one of: software executed by one or more processors; or one or more hardware circuits; or a combination of software executed by one or more processor and one or more hardware circuits.

According to one embodiment, the logical memory unit is implemented by one of: software executed by one or more processors; or one or more hardware circuits; or a combination of software executed by one or more processor and one or more hardware circuits.

According to a further aspect, there is provided a data processing system comprising: a processing unit; a flash memory; and the above flash memory interface.

According to one embodiment, the flash memory comprises a program/erase controller.

According to a further aspect, there is provided a method of accessing a flash memory, the method comprising: determining whether an address of a flash memory access operation corresponds to a logical or physical address by comparing the address with one or more address ranges; if it is determined that the address is a physical address, directing the physical address to the flash memory; and if it is determined that the address is a logical address, converting the logical address into a physical address and providing the physical address to the flash memory.

According to one embodiment, the one or more address ranges are stored in a configuration memory.

According to one embodiment, converting the logical address into a physical address comprises: converting the logical address into an identifier of one or more blocks in the flash memory; and generating a physical address based on the logical address and on the identifier.

According to one embodiment, generating the physical address based on the identifier comprises one or more of: the management of blocks and/or of pages in the flash memory by a storekeeper; the mapping of the logical address and/or block identifier to a physical address in the flash memory based on at least one offset; the assignment of a physical address in the flash memory to a logical address and/or block identifier by rotation among the available physical addresses; and the decryption of the logical address.

According to one embodiment, the method further comprises: providing each physical address to a write controller of the flash memory if the flash memory access operation corresponds to a write operation; and providing each physical address to a read input of the flash memory if the flash memory access operation corresponds to a read operation.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Figure 1:
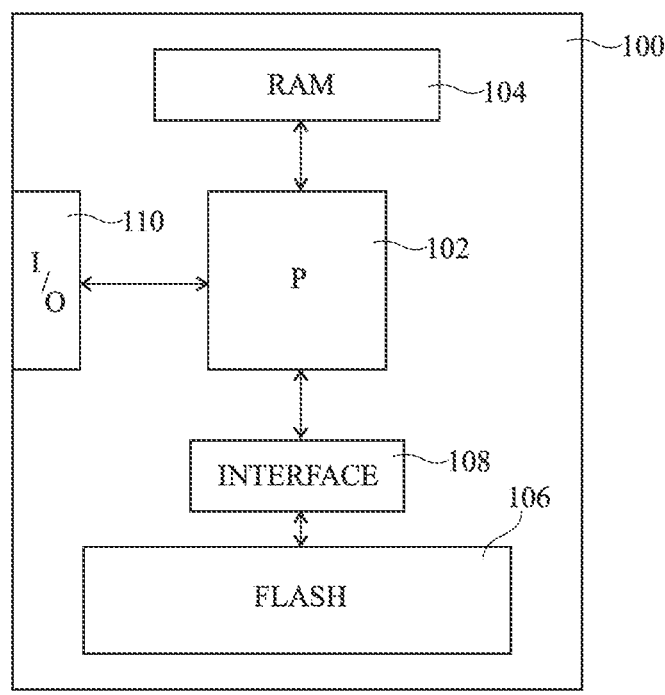
FIG. 1 schematically illustrates a data processing system according to example embodiment of the present disclosure.

Throughout the present disclosure, the term "connected" is used to designate a direct connection between elements, whereas the term "coupled" is used to designate a connection between elements that may be direct, or that may be via one or more intermediate elements such as buffers, capacitors, etc.

For clarity, only those steps and elements useful for an understanding of the embodiments of the present disclosure will be described in detail and illustrated in the drawings. Other features, such as the electronic behavior of a flash memory during write, read and erase operations, has not been detailed, the described embodiments being compatible with standard flash memory technologies that will be known to those skilled in the art.

FIG. 1 schematically illustrates a data processing system 100 comprising a processing unit (P) 102, which, for example, comprises one or more processors under control of instructions stored in an instruction memory (RAM) 104, which is, for example, a RAM (random access memory). The processing unit 102 is further coupled to a flash memory (FLASH) 106 via a memory interface (INTERFACE) 108. The processing system 100 also, for example, comprises an input/output interface (I/O) 110 coupled to the processing unit 102, allowing communication with other devices.

As known by those skilled in the art, while the granularity of operations in an EEPROM is generally at the byte level, in a flash memory, memory cells are erasable with a higher granularity, for example, at the page or block level. For example, in some flash memories, it is possible to write individual bytes to the pages of the flash memory, but the number of times that each page can be written in between erase operations of the page may be restricted to one. Erase operations generally concern a minimum unit size of one page, or of one block, wherein a block, for example, comprises two or more pages.

While in the erased state, the cells of a flash memory are generally at a logic "1", and cells can subsequently be programmed to maintain the logic "1", or transition to a logic "0". However, once a cell has transitioned to a logic "0", that cell can only be programmed back to a logic "1" by an erase operation. This means that in some cases it may be permissible to program a same byte more than once between erase operations, as long as this does not involve returning any bit from the logic "0" to the logic "1" state. For example, the byte "1110 1111" could be reprogrammed to "1100 1111".

With reference again to FIG. 1, it is assumed that the flash memory 106 has replaced an EEPROM in the data processing system (100). According to embodiments of the present disclosure, rather than modifying the operation of the processing unit 102 to accommodate this change, the flash memory interface 108 is implemented between the processing unit 102 and the flash memory 106. For example, the flash memory interface 108 is implemented in a separate chip to the processing unit 102 and the flash memory 106. Alternatively, the flash memory interface 108 could be integrated on the flash memory chip. The processing unit 102, for example, knows only that it may access a non-volatile memory, without knowing the particular form of this memory. Thus the processing unit 102 need not take into account the particular programming constraints of the flash memory, such as the granularity of erase operations, page management, etc.

Figure 2:
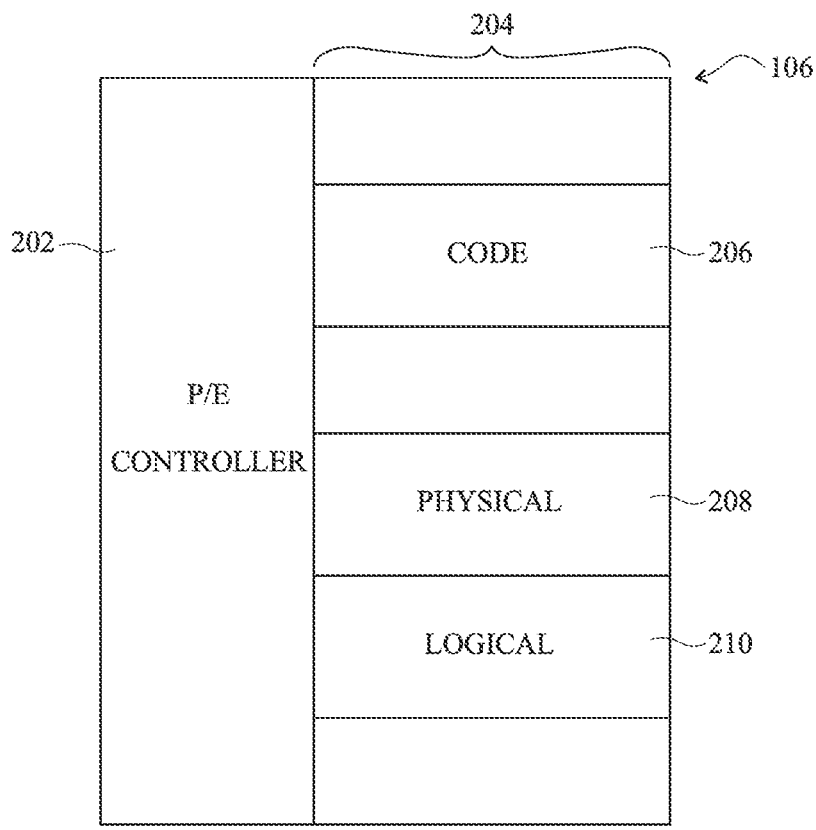
FIG. 2 schematically illustrates a flash memory of the data processing system of FIG. 1 in more detail according to example embodiment.

FIG. 2 schematically illustrates the flash memory 106 in more detail according to example embodiment.

The flash memory 106, for example, comprises a program/erase controller (P/E CONTROLLER) 202, which is responsible for writing to and erasing pages or blocks of pages of the non-volatile storage portion 204 of the flash memory.

The non-volatile storage portion 204, for example, includes a zone (CODE) 206 storing program code to be executed by the processing unit 102. The non-volatile storage portion 204 also, for example, comprises one or more physical memory zones (PHYSICAL) (208) and one or more logical memory zones (LOGICAL) 210. The physical memory zones 208 are zones which are accessed by the processing unit 102 directly using physical addresses. The logical memory zones 210 are however accessed by the processing unit 102 using logical addresses. As known to those skilled in the art, while physical addresses directly identify physical memory locations in a memory, logical addresses do not directly correspond to specific physical memory locations, but are seen and treated by the processing unit as if they did. The logical addresses are converted into physical addresses by the flash memory interface 108. This conversion may be implemented using memory management algorithms and may vary over time. In some embodiments, the processing unit 102 is not aware of which addresses are physical addresses, and which are logical addresses.

In some embodiments, the physical address zones 208 are used to store data that is updated relatively rarely, such as certain parameters, encryption keys, passwords, etc. The logical address zones 210 are, for example, used to store data that is more dynamic, and is likely to be modified on a more regular basis, such as counters, variables, etc.

An indication of the address ranges corresponding to the physical and logical address zones 208, 210 is, for example, stored by or otherwise accessible to the interface circuit 108, as will be described in more detail below.

Figure 3:
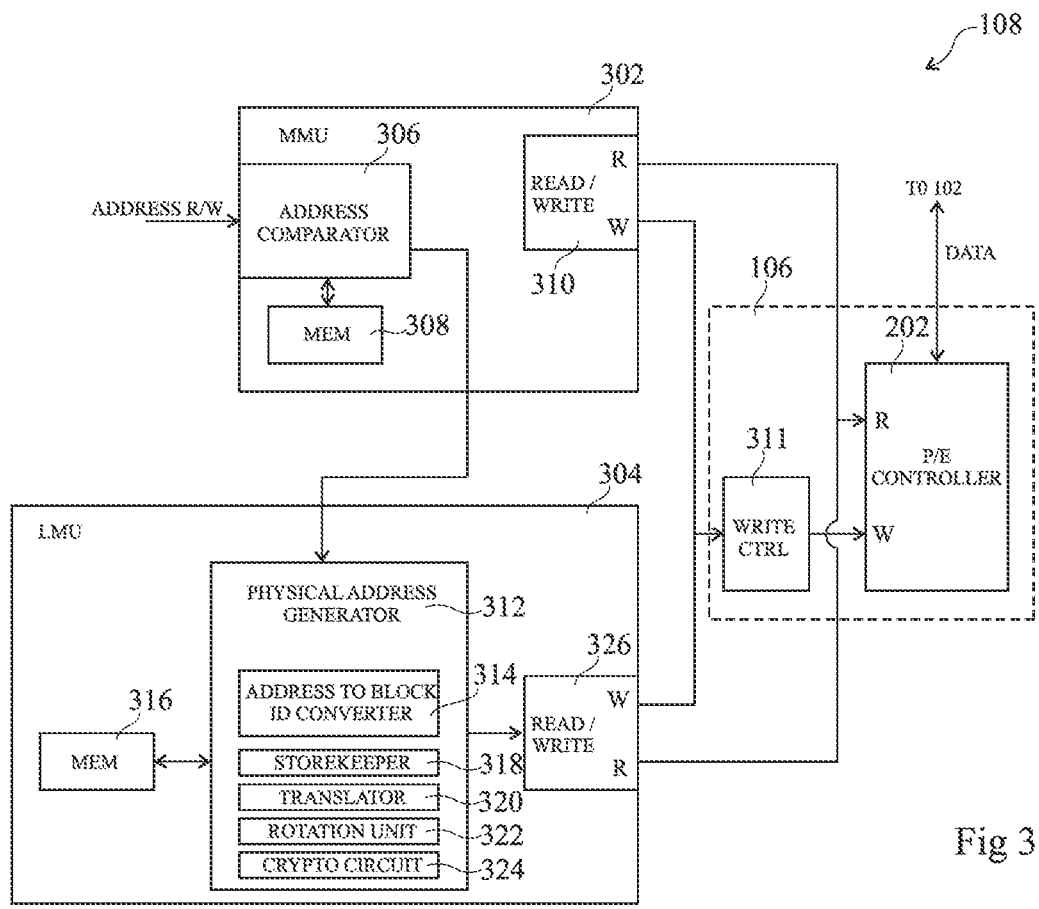
FIG. 3 schematically illustrates an interface circuit of the data processing system of FIG. 1 in more detail according to example embodiment.

FIG. 3 schematically illustrates the flash memory interface 108 of FIG. 1 in more detail according to example embodiment.

The interface 108, for example, comprises a memory management unit (MMU) 302 and a logical memory unit (LMU) 304. Each of the units 302 and 304 may be implemented entirely by hardware, entirely using software executed by a suitable processor (not illustrated), or by a combination of hardware and software. For example, in some embodiments, either or both of the units 302, 304 could be implemented by an ASIC (application specific integrated circuit) and/or by an FPGA (field-programmable gate array).

The MMU 302, for example, receives, from the processing unit 102, the addresses (ADDRESS R/W) of read and write operations to the flash memory 106. The MMU 302, for example, comprises an address comparator (ADDRESS COMPARATOR) 306, which compares each address with one or more address ranges defining the physical and/or logical memory locations in the flash memory 106. For example, the MMU 302 comprises a configuration memory (MEM) 308 storing an indication of the address ranges of the physical memory locations and/or of the logical memory locations. The memory 308 is, for example, accessed by the address comparator 306 in order to determine whether a given address falls within the physical memory address range or the logical memory address range. Addresses falling within the physical address zone 208 are considered to be physical addresses, and are, for example, forwarded to the flash memory 106. Furthermore, addresses in the zone 206 of FIG. 2 relating to code are also, for example, considered by the system to correspond to physical addresses, and are, for example, forwarded to the flash memory 106. However, addresses falling within the logical address zone 210 are considered to be logical addresses and are forwarded to the LMU 304.

In some embodiments, the MMU 302 further comprises a read/write switch (READ/WRITE) 310. Addresses that are identified by the comparator 306 as being physical addresses are, for example, provided to the flash memory 106 via the switch 310, which forwards them to a write or read input of the flash memory 106 based on whether they concern read or write operations. For example, the MMU 302 also receives from the processing unit 102, with the address, a read-enable RE and/or write-enable WE signal indicating whether the operation concerns a read or write operation, and this signal is provided to the switch 310. For read operations, the address is, for example, provided directly to a read input R of the program/erase controller 202 of the flash memory 106. For write operations, the address is, for example, provided to a write control circuit (WRITE CTRL) 311 of the flash memory 106, which in turn provides the address to a write input W of the program/erase controller 202. The program/erase controller 202 also, for example, receives the data to be written (DATA) from the processing unit 102.

The LMU 304, for example, comprises a physical address generator (PHYSICAL ADDRESS GENERATOR) 312, which receives the logical addresses from the MMU 302, and generates physical addresses based on the logical addresses. In some embodiments, the generator 312 comprises an address to block ID converter (ADDRESS TO BLOCK ID CONVERTER) 314, which converts each logical address into a block identifier of the block in the flash memory containing the physical address corresponding to the logical address. For example, the generator 312 comprises, or otherwise has access to, a memory (MEM) 316 and generates the physical address based on reference data stored in this memory. This memory 316 stores, for example, a correspondence table indicating the mapping between block identifiers and physical addresses. The correspondence table is, for example, updated each time a page or block in the memory is erased, and the physical addresses of the pages and blocks are updated.

In one embodiment, the physical address generator 312 comprises a storekeeper (STOREKEEPER) 318 adapted to manage the storage of data in the flash memory 106, and in particular to manage the use of blocks and/or pages in the flash memory 106. For example, the storekeeper 318 implements the storage method described in French patent application FR 16/54490, corresponding to European patent application EP 16198176, U.S. patent application Ser. No. 15/380,509 and Chinese patent application CN 201611054274.4, the content of these applications being incorporated herein by reference to the extent permitted by the law. Furthermore, the storekeeper 318 may additionally or alternatively implement the indexing method described in French patent application FR 16/58442, corresponding to European patent application EP 17156412, U.S. patent application Ser. No. 15/444,746 and Chinese patent application CN 201710178831.1, the contents of these applications also being incorporated herein by reference to the extent permitted by the law.

Additionally or alternatively, the physical address generator 312 may comprise a translator (TRANSLATOR) 320 configured to map logical addresses and/or block identifiers to physical addresses in the flash memory 106 based on at least one offset. The offset to be applied for each logical address/block identifier is, for example, constant, and is, for example, indicated in the memory 316.

Additionally or alternatively, the physical address generator 312 may comprise a rotation unit (ROTATION UNIT) 322 configured to assign physical addresses in the flash memory to logical addresses and/or block identifiers by rotation among the available physical addresses. For example, the rotation unit 322 implements a system similar to a FIFO (first-in-first-out) memory, according to which the addressable pages of the flash memory are used in turn, thereby spreading the wear over the entire memory array.

Additionally or alternatively, the physical address generator 312 may comprise a cryptographic circuit (CRYPTO CIRCUIT) 324 configured to generate physical addresses by decrypting the logical address. Indeed, in some embodiments additional security is provided by encrypting at least some of the physical addresses in the flash memory 106 to generate the logical addresses used by the processing unit 102. In this way, the location of the data in the flash memory cannot be directly extracted from the addresses processed by the processing unit 102.

In some embodiments, the LMU 304 also, for example, comprises a read/write switch (READ/WRITE) 326, similar to the switch 310. For example, the switch 326 receives from the processing unit 102 the indication of whether each operation concerns a read or write, and forwards the address generated by the generator 312 to the write or read input of the flash memory 106 based on whether it concerns a read or write operation.

The write controller 311, for example, receives the physical address of a write operation to be performed to the physical or logical address zone 208, 210, and determines whether the corresponding page should be reprogrammed, possibly following an erase operation, or whether the write operation should be performed in a new page. In the latter case, a new physical location of the page is, for example, stored to the memory 316 so that the LMU 304 is able to manage the new mapping of the logical address to the physical address and/or block ID.

Figure 4:
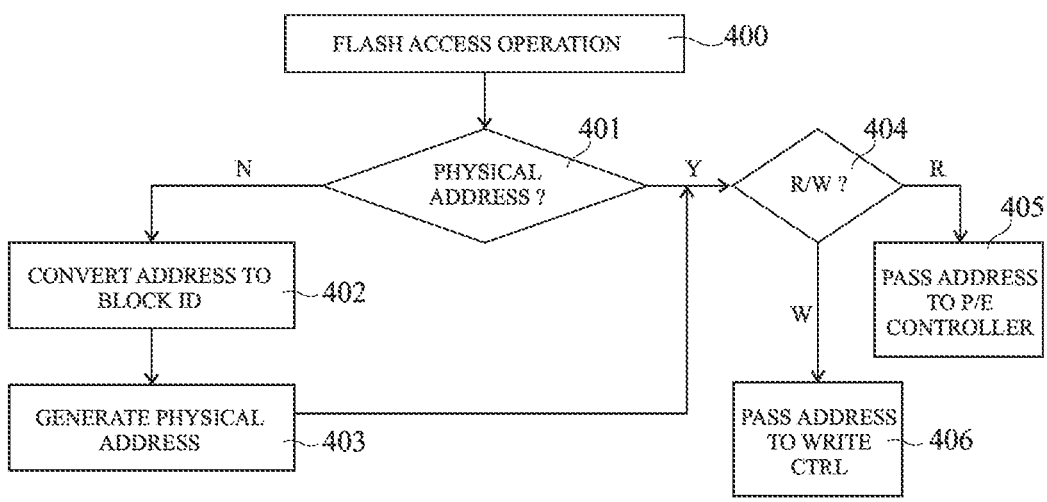
FIG. 4 is a flow diagram representing operations in a method of accessing a flash memory according to an example embodiment of the present disclosure.

FIG. 4 is a flow diagram illustrating operations in a method of accessing a flash memory according to an example embodiment. The method is, for example, initiated by a memory access requested by the processing unit 102 of FIG. 1, and implemented in software and/or hardware by the MMU and LMU of FIG. 3.

In an operation 400, a flash access operation is initiated by the processing unit 102, and the corresponding address is provided to the interface 108.

In operation 401, is determined whether the address of the memory access operation corresponds to a physical address. In particular, as indicated above, the address is, for example, compared to one or more address ranges of physical addresses and/or to one or more address ranges of logical addresses.

If the address does not correspond to a physical address, in an operation 402, it is, for example, converted into a block identifier by the converter 314 of the MMU, and in an operation 403, the physical address is generated based on the logical address and/or the block identifier.

After operation 403, or after operation 401 if it is determined that the address is a physical address, an operation 404 is performed involving verifying whether the memory access is a read or write operation. In the case of a read operation, the address is passed, in an operation 405, directly to the program/erase controller 202. In the case of a write operation, the address is passed, in an operation 406, to the write controller 311.

An advantage of the flash memory interface described herein is that it permits access to a flash memory in a manner that is transparent to the processing unit 102. Thus the operation of the processing unit need not take into account the particular constraints of a flash memory. Furthermore, by providing both physical and logical address zones in the memory, it is possible to provide relatively quick access to the flash memory for parameters that vary relatively little, and which can be accessed directly using their physical address, and only logical addresses are processed by the LMU. As such, the processing burden of the LMU can be reduced.

Having thus described at least one illustrative embodiment, various alterations, modifications and improvements will readily occur to those skilled in the art. For example, while a physical address generator 312 has been illustrated in FIG. 3 as comprising a storekeeper, a translator, a rotation unit and a cryptographic circuit, it will be apparent to those skilled in the art that in some embodiments only one or some of these elements could be implemented in the address generator.

Furthermore, it will be apparent to those skilled in the art that in some embodiments the read/write switches 310, 326 could be omitted from the MMU 302 and/or LMU 304, and integrated, for example, in the flash memory 106.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A flash memory interface for providing an interface to a flash memory, the flash memory interface comprising:
   a first hardware circuit including a memory management unit including a comparator configured to determine whether an address of a flash memory access operation is a logical address or a physical address by determining whether the address of the flash memory access operation corresponds to a physical memory zone of a flash memory or a logical memory zone of the flash memory by comparing the address of the flash memory access operation with one or more address ranges; and
   a second hardware circuit including a logical memory unit configured to convert input logical addresses into converted physical addresses and to provide the converted physical addresses to the flash memory;
   wherein the memory management unit is configured to direct the physical address to the flash memory, without passing through the logical memory unit, in response to determining that the address of the flash memory access operation is a physical address, and to direct the logical address to the logical memory unit for conversion into one of the converted physical addresses in response to determining that the address of the flash memory access operation is a logical address.

2. The flash memory interface of claim 1, wherein the memory management unit further comprises a configuration memory configured to store an indication of said one or more address ranges.

3. The flash memory interface of claim 1, wherein the logical memory unit comprises:
   an address generator configured to generate a converted physical address based on the logical address and on a block identifier arranged to identify one or more blocks in the flash memory, wherein the address generator includes an address converter configured to convert each input logical address into a corresponding block identifier.

4. The flash memory interface of claim 3, wherein the address generator is configured to:
   manage a usage of blocks, pages, or blocks and pages in the flash memory; or
   map the input logical addresses, block identifiers, or the input logical addresses and block identifiers to the converted physical addresses in the flash memory based on at least one offset; or
   assign at least some physical addresses in the flash memory to corresponding logical addresses, corresponding block identifiers, or the corresponding logical addresses and the corresponding block identifiers by rotation among available physical addresses; or
   generate at least one of the converted physical addresses based on a decryption of at least one of the input logical addresses.

5. The flash memory interface of claim 1, wherein the memory management unit and the logical memory unit are further configured to:
   provide the physical address and the one of the converted physical addresses, respectively, to a write controller of the flash memory if the flash memory access operation corresponds to a write operation; and
   provide the physical address and the one of the converted physical addresses, respectively, to a read input of the flash memory if the flash memory access operation corresponds to a read operation.

6. A data processing system comprising:
a processing unit;
a flash memory including a physical memory zone and logical memory zone; and
a flash memory interface configured to provide an interface between the processing unit and the flash memory, the flash memory interface including:
  a first hardware circuit including a memory management unit including an address comparator arranged to determine if an input address is an input physical address or an input logical address by determining whether the address of the flash memory access operation corresponds to the physical memory zone of the flash memory or the logical memory zone of the flash memory by comparing the address of the flash memory access operation with one or more address ranges; and
  a second hardware circuit including a physical address generator configured to convert the input logical address to a converted physical address and provide the converted physical address to the flash memory, wherein the memory management unit is configured to direct the physical address to the flash memory, without passing through the physical address generator, in response to determining that the address of the flash memory access operation is a physical address, and to direct the logical address to the logical memory unit for conversion into one of the converted physical addresses in response to determining that the address of the flash memory access operation is a logical address.

7. The data processing system of claim 6, wherein the flash memory comprises a program/erase controller.

8. The data processing system of claim 6, wherein the processing unit is arranged to communicate with an electronically erasable programmable read-only memory (EEPROM).

9. The data processing system of claim 6, wherein the flash memory and the flash memory interface are integrated in a single integrated circuit package.

10. The data processing system of claim 6, wherein the flash memory interface is arranged has hardware-based circuitry in an application specific integrated circuit (ASIC) or a field-programmable gate array (FPGA).

11. The data processing system of claim 6, wherein the physical address generator is arranged in a logical memory unit, and wherein the logical memory unit is configured to:
  manage a usage of blocks, pages, or blocks and pages in the flash memory; and
  map the input logical address to the converted physical address based on at least one offset.

12. The data processing system of claim 11, wherein the logical memory unit is configured to map the input logical address to the converted physical address based on a block identifier.

13. The data processing system of claim 11, wherein the logical memory unit further includes a cryptographic circuit configured to generate the converted physical address based on a decryption of at least a portion of the input logical address.

14. A method of accessing a flash memory, the method comprising:
  determining, with a first hardware circuit, whether an input address of a flash memory access operation corresponds to an input logical address or an input physical address by determining whether the address of the flash memory access operation corresponds to a physical memory zone of the flash memory or a logical memory zone of the flash memory by comparing the input address with one or more address ranges;
  if it is determined that the input address is the input physical address, directing the input physical address to the flash memory without the input address being sent to a second hardware circuit including a logical memory unit for conversion to a physical address; and
  if it is determined that the input address is the input logical address, converting the input logical address into a converted physical address and providing the converted physical address to the flash memory.

15. The method of claim 14, wherein the one or more address ranges are stored in a configuration memory.

16. The method of claim 14, wherein converting the input logical address into converted physical address comprises:
  converting the input logical address into an identifier of one or more blocks in the flash memory; and
  generating the converted physical address based on the input logical address and on the identifier of the one or more blocks.

17. The method of claim 16, wherein generating the converted physical address based on the input logical address and on the identifier of the one or more blocks comprises one or more of:
  managing blocks, pages, or blocks and pages in the flash memory;
  mapping the input logical address, mapping the identifier of the of the one or more blocks, or mapping the input logical address and the identifier of the one or more blocks to a physical address in the flash memory based on at least one offset;
  assigning a physical address in the flash memory to a logical address, a block identifier, or a logical address and a block identifier by rotation among available physical addresses in the flash memory; and
  decrypting the input logical address.

18. The method of claim 14, further comprising:
  providing the input physical address or the converted physical address to a write controller of the flash memory if the flash memory access operation corresponds to a write operation; and
  providing the input physical address or the converted physical address to a read input of the flash memory if the flash memory access operation corresponds to a read operation.

* * * * *